Oct. 13, 1959     G. M. MAST     2,908,094
TRANSPARENCY VIEWER
Filed March 18, 1957
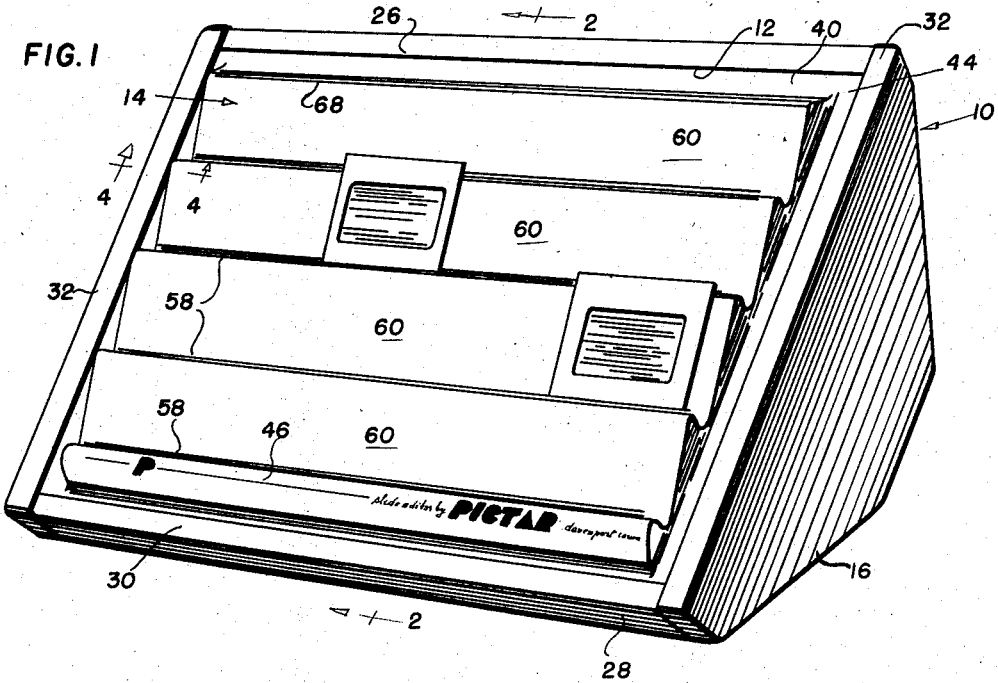
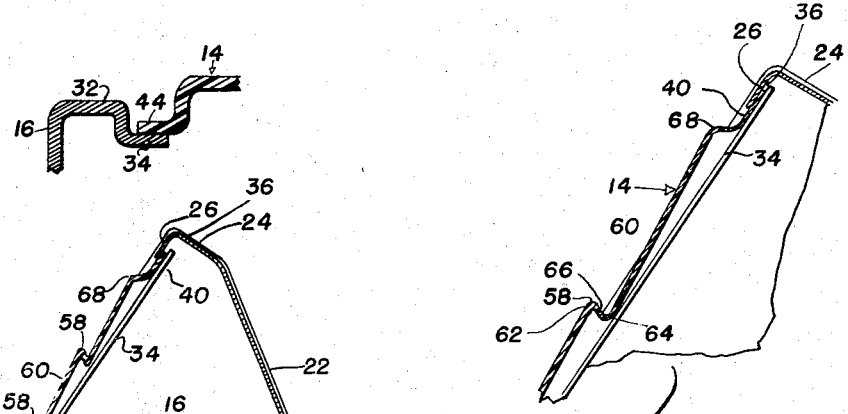
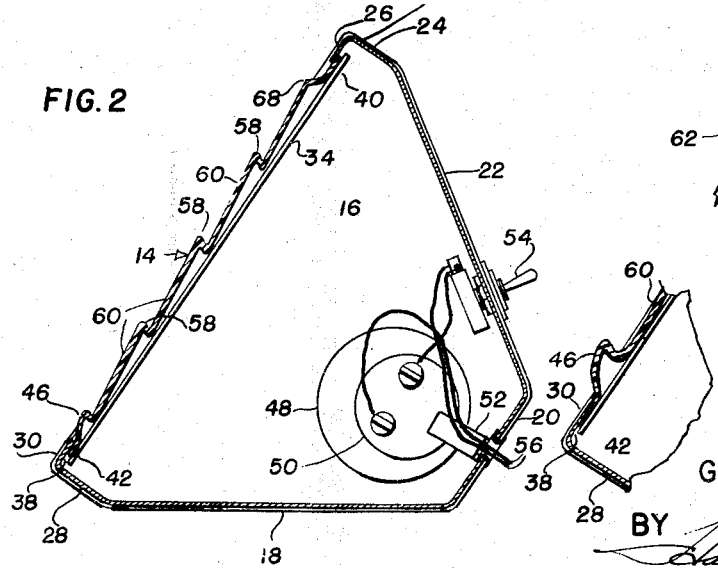
INVENTOR
GIFFORD M. MAST
BY
ATTORNEY United States Patent Office 2,908,094
Patented Oct. 13, 1959

2,908,094

TRANSPARENCY VIEWER

Gifford M. Mast, Davenport, Iowa, assignor to Mast Development Co., Davenport, Iowa, a corporation of Iowa Application March 18, 1957, Serial No. 646,830

4 Claims. (Cl. 40—106.1)

This invention relates to a transparency viewer or slide editor which enables the temporary positioning thereon of several transparencies or slides for the purpose of enabling viewing thereof.

Although transparency viewers or slide editors as such are well known, the types currently available leave much to be desired primarily because the slide-supporting means are awkward and difficult to use and the viewing screens are difficult to remove for servicing the source of illumination. Accordingly, it is a principal object of the present invention to provide an improved viewer having novel viewing screen means for simply and easily supporting one or more slides. It is a significant object of the invention to provide a viewing screen of translucent one-piece material of zigzag configuration in section so as to afford a plurality of ledges or steps, stair fashion, arranged upwardly and rearwardly, the steps or ledges being alternated with sloping wall portions, and the ledges affording surfaces on which slides may rest while leaning against the proximate wall portions. The invention features continuous transverse ledges along which the slides may be readily moved. The invention further features ledges on which the supporting surfaces slope downwardly and rearwardly so as to retain the slides against inadvertent displacement, thereby preventing cascading of the slides in the event that one on an upper ledge is inadvertently dislodged. Other objects of the invention reside in improved means for mounting the viewing screen, a simple and economical construction in which the parts may be readily fabricated, and such other objects and features as will be apparent from the ensuing description of a preferred embodiment of the invention as illustrated in the accompanying sheet of drawings, the several figures of which will be described immediately below.

Figure 1 is a perspective of the viewer as seen from the front and one side thereof.

Figure 2 is a section, on a slightly reduced scale, as seen generally along the line 2—2 of Figure 1.

Figure 3 is an enlarged fragmentary section repeating portions of Figure 2.

Figure 4 is an enlarged fragmentary section as seen along the line 4—4 of Figure 1.

The viewer comprises essentially a generally box-like structure 10 having an open front at 12 which is normally closed by a preferably translucent viewing screen 14. The structure 10 includes opposite end walls 16, a bottom 18 and a back comprising angularly related portions 20, 22 and 24, the last-named of which affords a top edge element 26. The bottom includes an integral angularly related forward portion 28 which provides a transverse bottom or lower element 30 parallel to the upper element 26, these two elements defining the top and bottom of the front opening 12. Opposite ends or sides of the opening 12, which is rectangular, are afforded by upwardly sloping edge-elements 32 which are respectively the marginal front edges of the ends 16. The elements 26, 30 and 32 are generally coplanar in a plane that slopes upwardly and rearwardly from the horizontal.

As best shown in Figure 4 each end element 32 is rearwardly and inwardly deformed to afford an integral parallel lip or ledge 34 and, as further shown in Figure 3, the lip projects beneath the proximate turned-down portion of the element 26 so as to afford receiver means 36. This construction is repeated at both ends of the structure 10 and the two receiver means combine to form in effect an incomplete channel which opens downwardly in the plane in which the elements 26, 30 and 32 lie. The lip 34 affords a lower receiver means 38 with the proximate turned-up portions of the bottom element 30, this receiver means opening upwardly in the aforesaid plane.

Considering the screen 14 apart from its slide-supporting means, which will be described below, the screen is rectangular and may be considered as having upper and lower marginal flanges 40 and 42, which are received respectively by the receiver means 36 and 38, and opposite end flanges 44 (Figure 4) which rest respectively on the end element lips or ledges 34. As best shown in Figure 3, the configuration of the one-piece screen 14 is such that it has a transverse lower ridge 46 which affords a stop engaging the up-turned edge of the bottom element 30 so as to limit downward movement of the screen into the receiver means 38. As distinguished from this, the upper receiver means 36 is relatively deeper and the upper flange portion 40 on the screen is sufficiently clear of obstructions so as to enable the screen to be bodily shifted upwardly into the receiver means 36, an amount sufficient to clear the lower flange 42 from the lower receiver means 38, whereby the lower portion of the screen may be lifted away from the lips or ledges 34 and then shifted downwardly to disengage the upper edge or flange 40 from the receiver means 36. The screen 14 may be thus readily removed from the frame afforded by the elements 26, 30 and 32 for servicing or replacing the source of illumination, here shown as an incandescent lamp 48 carried in a socket 50 that is mounted on the back wall 20 by a bracket 52. A switch is shown typically at 54 and leads 56 are illustrated as electrical conductors for connection to any convenient outlet. The screen may be installed in the open front 12 of the box by reversing the procedure described above. In brief, the screen is retained only by its upper and lower marginal edges 40 and 42.

As best seen in Figure 2 the transparency- or slide-supporting means on the outer surface of the screen is afforded by constructing the screen or diffuser of one-piece plastic, such as acrylic material; although it may be of any other material in which the inventive configuration may be achieved. The screen as seen in section has a zigzag configuration, affording, stair fashion, a plurality of transverse horizontal, vertically spaced apart ledges or steps 58 alternated with a plurality of wall portions 60. Each ledge except the lowermost ledge is offset rearwardly as well as upwardly of the ledge next below it, which result follows from the rearwardly and upwardly sloping disposition of the screen as a whole, and each ledge has front and rear edges 62 and 64 and a relatively narrow upper supporting surface 66 between said edges (Figure 3). Each wall portion 60 integrally adjoins the back or rear edge 64 of the ledge next below it and slopes upwardly and rearwardly to adjoin the front edge 62 of the ledge next above it, with the exception of the uppermost wall portion 60 which terminates in an ogee 68 with the upper marginal flange portion 40.

The vertical spacing of the ledges is on the order of a typical transparency or slide, the thirty-five mm. being the most popular. Accordingly, the supporting surface 66 of each ledge, being elongated transversely of the screen, is adapted to support one or more slides resting edgewise thereon and leaning against the complementary wall surface 60. As best illustrated in Figure 3 the ledge is constructed so that its supporting surface slopes downwardly and rearwardly or in undercut fashion, thereby serving to retain the lower edge of the supported slide so as to render more difficult inadvertent displacement of the slide from the ledge. Since the ledges are continuous, the slides may be readily slid lengthwise of the screen and of course may be readily removed by lifting them away from the screen. The feature of retaining the slides by the undercut supporting surfaces is important from the standpoint of avoiding cascading of the slides in the event that an upper slide is inadvertently dislodged.

The end walls 16 are identical, which facilitates production of the viewer, since rights and lefts are not required. That is to say, the structure when viewed from the end is symmetrical.

As will have been seen the structure is simply and economically constructed, is attractive in appearance, affords a screen or diffuser having novel slide-supporting means thereon, and further provides a screen-mounting means enabling ready removal and replacement of the screen. Features of the invention not specifically enumerated will undoubtedly occur to those versed in the art, as will many modifications and alterations in the preferred embodiment disclosed, all of which may be achieved without departure from the spirit and scope of the invention.

What is claimed is:

1. In a transparency viewer for facilitating the editing and sequential selection of camera slides and the like and including a box-like structure having an open front defined by support elements disposed generally in an upwardly and rearwardly inclined plane, the improvement comprising a one-piece viewing screen supported by said elements and closing said front, said screen being of zig-zag configuration to afford at its outer face a plurality of transverse horizontal, vertically spaced apart ledges and a plurality of wall portions alternated with said ledges, said ledges being spaced apart vertically on the order of the height of a typical transparency and each wall portion being of comparable height, each ledge except the lowermost ledge being offset rearwardly as well as upwardly of the ledge next below it and each ledge having a front edge and a rear edge and a relatively narrow upper supporting surface between said edges, the front edge of each ledge merging with the wall next below it and each wall portion except the uppermost integrally adjoining and merging into the rear edge of the ledge next below it and sloping upwardly and rearwardly and integrally adjoining the front edge of the next higher ledge, each ledge and the wall portion adjoining and extending upwardly therefrom being adapted to support a horizontal row of transparencies resting edgewise on the supporting surface of said ledge and leaning rearwardly against said wall portion without vertically overlapping the next higher ledge, said screen being capable of passing light from a light source rearwardly thereof so as to illuminate supported transparencies.

2. A transparency viewer, comprising: a box-like structure having an open front defined by rectangular frame means disposed generally in a rearwardly and upwardly inclined plane and including top, bottom and opposite end elements, said top element having receiver means opening downwardly in said plane and said bottom element having receiver means opening upwardly in said plane; each of said end elements having ledge means inwardly thereof and lying in said plane; a rectangular viewing screen supported by said receiver and ledge means and having upper and lower flange portions received respectively in the receiver means and opposite edge flange means resting respectively on the ledge means; said upper receiving means being relatively deep to enable upward shifting of the screen in said plane to disengage the lower flange upwardly from the bottom receiver means whereby the screen may be swung outwardly to clear the lower flange portion from said bottom receiver means and may be then shifted downwardly to disengage the upper flange portion from the upper receiver means; and means on the outer surface of the screen for supporting transparencies.

3. The invention defined in claim 2, in which: the means for supporting transparencies comprises a plurality of vertically spaced apart steps arranged stair fashion over said outer surface.

4. The invention defined in claim 3, in which: the steps project forwardly and upwardly so as to present front edges offset above and ahead of said plane and rear edges generally in said plane.

References Cited in the file of this patent

UNITED STATES PATENTS

| | | |
|---|---|---|
| 1,500,867 | Glover | July 8, 1924 |
| 2,018,824 | Wilke | Oct. 29, 1935 |
| 2,545,255 | Broce | Mar. 13, 1951 |
| 2,623,314 | Lombard | Dec. 30, 1952 |
| 2,699,619 | Fink | Jan. 18, 1955 |
| 2,789,700 | King et al. | Apr. 23, 1957 |
| 2,816,379 | Ensor | Dec. 17, 1957 |